(12) United States Patent
Iftime et al.

(10) Patent No.: US 9,040,629 B1
(45) Date of Patent: *May 26, 2015

(54) THERMALLY SWITCHABLE COMPOSITION

(71) Applicant: XEROX CORPORATION, Norwalk, CT (US)

(72) Inventors: Gabriel Iftime, Mississauga (CA); Gordon Sisler, Stoney Creek (CA); Carolyn Moorlag, Mississauga (CA); Matthew Heuft, Oakville (CA); Gail Song, Milton (CA); Brynn Dooley, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/074,578

(22) Filed: Nov. 7, 2013

(51) Int. Cl.
| | |
|---|---|
| C09D 183/04 | (2006.01) |
| C09D 133/26 | (2006.01) |
| C08F 8/00 | (2006.01) |
| C08L 83/00 | (2006.01) |

(52) U.S. Cl.
CPC ............ C09D 183/04 (2013.01); C09D 133/26 (2013.01); C08F 8/00 (2013.01); C08L 83/00 (2013.01)

(58) Field of Classification Search
None
See application file for complete search history.

(56) References Cited

U.S. PATENT DOCUMENTS

| | | | | |
|---|---|---|---|---|
| 4,101,686 A | * | 7/1978 | Strella et al. | 430/102 |
| 4,185,140 A | * | 1/1980 | Strella et al. | 219/216 |
| 5,461,103 A | * | 10/1995 | Bafford et al. | 524/460 |
| 6,660,247 B1 | * | 12/2003 | Gutowska et al. | 424/9.1 |
| 8,569,048 B2 | * | 10/2013 | Fujimoto | 435/289.1 |
| 8,696,105 B1 | * | 4/2014 | Moorlag et al. | 347/103 |
| 2002/0081515 A1 | * | 6/2002 | Tsubuko et al. | 430/114 |
| 2004/0121017 A1 | * | 6/2004 | Ishii et al. | 424/487 |
| 2004/0134846 A1 | * | 7/2004 | Akiyama et al. | 210/198.2 |
| 2004/0188661 A1 | * | 9/2004 | Tsutsui et al. | 252/583 |
| 2005/0104049 A1 | * | 5/2005 | Tsutsui et al. | 252/583 |
| 2010/0251914 A1 | | 10/2010 | Zhou et al. | |
| 2010/0255413 A1 | * | 10/2010 | Wu et al. | 430/56 |
| 2011/0117477 A1 | * | 5/2011 | Pareek et al. | 430/2 |

OTHER PUBLICATIONS

Cohen Stuart et al. "Emerging applications of stimuli-responsive polymer materials" Nature Materials, vol. 9, 2010, 101-113.*
Ju et al. "pH/temperature-responsive behaviors of semi-IPN and comb-type graft hydrogels composed of alginate and poly(N-isopropylacrylamide)" Polymer 42, 2001, 6851-6857.*
Zhang et al. "Dynamic Properties of Temperature-Sensitive Poly(N-isopropylacrylamide) Gel Cross-Linked through Siloxane Linkage" Langmuir 2001, 17, 12-16.*
Alarcon et al. "Stimuli responsive polymers for biomedical applications" Chem. Soc. Rev., 2005, 34, 276-285.*

(Continued)

*Primary Examiner* — Robert S Loewe
(74) *Attorney, Agent, or Firm* — Pillsbury Winthrop Shaw Pittman LLP

(57) ABSTRACT

A composition including a stimulus-responsive polymer, a base polymer and a catalyst, wherein the surface free energy of the stimulus-responsive polymer is reversibly adjustable from a first surface free energy state to a second surface free energy state when heated to an activation temperature, and wherein the base polymer does not include a platinum catalyst is described. A method of preparing the composition and a method of adjusting a surface free energy of the composition is also described.

19 Claims, 3 Drawing Sheets

(56) References Cited

OTHER PUBLICATIONS

Tsutsui et al. "Preparation and Optical Properties of an All-Polymer Light Modulator Using Colored N-Isopropylacrylamide Gel Particles in a Gel-in-Gel System" Journal of Applied Polymer Science, vol. 103, 2295-2303, 2007.*

U.S. Appl. No. 13/746,910, filed Jan. 22, 2013 in the name of Carolyn Moorlag et al.

U.S. Appl. No. 13/746,920, filed Jan. 22, 2013 in the name of Carolyn Moorlag et al.

Galaev et al., "Thermoreactive water-soluble polymers, nonionic surfactants, and hydrogels as reagents in biotechnology," Enzyme Microbial Technology, vol. 15, pp. 354-366, May 1993.

Mori et al., "Temperature Induced Changes in the Surface Wettability of SBR+PNIPA Films," 292, Macromol. Mater. Eng., pp. 917-922 (2007).

Gelest, Inc. Product Brochure, "Reactive Silicones: Forging New Polymer Links," 64 pages (2013). Available at http://www.gelest.com/goods/PDF/brochures/reactivesilicones.pdf.

* cited by examiner

STIMULUS

THERMALLY SWITCHABLE COMPOSITION

TECHNICAL FIELD

The present disclosure is related to thermally switchable compositions and methods of making the thermally switchable compositions.

RELATED APPLICATIONS

U.S. patent application Ser. No. 13/746,910, filed on Jan. 22, 2013, in the name of Carolyn Moorlag et. al, entitled "Thermally Switchable Transfix Blanket Made with Grafted Switchable Polymer for Aqueous Inkjet Printing," describes a polymer composition comprising a stimulus-responsive polymer dispersed in a base polymer matrix, wherein the surface free energy of the stimulus-responsive polymer is reversibly adjustable from a first surface free energy state to a second surface free energy state when heated to a predetermined critical activation temperature.

U.S. patent application Ser. No. 13/746,920, filed on Jan. 22, 2013, in the name of Carolyn Moorlag et. al, entitled "Thermally Switchable Transfix Blanket Made with Grafted Switchable Polymer for Indirect Printing," describes a polymer composition comprising a first polymer layer comprising a base polymer, and a second polymer layer grafted onto the first polymer layer, wherein the second polymer layer comprises a stimulus-responsive polymer, and the surface free energy of the stimulus-responsive polymer is reversibly adjustable from a first surface free energy state to a second surface free energy state when heated to a predetermined critical activation temperature.

U.S. Patent Application Publication No. 2010/0251914 to Zhou et al. describes an imaging member comprising a substrate and a surface layer comprising a heat sensitive material permitting reversible switching between compatible and non-compatible states within one second.

The entire disclosures of the above-mentioned applications are fully incorporated herein by reference.

BACKGROUND

The traditional approach to materials development has been to design materials with enhanced performance. Advanced materials are generally designed to perform one function. One problem is that maximizing one property, for example, adhesion of a substance to a surface, affects other properties, for example, the release of the substance from the surface. Solutions to these problems have generally been focused on adding more components with the expectation of independently controlling each property. However, often times, the additional component then interacts with other materials in the composition, thus adversely affecting different properties.

Additionally, the addition of many different specialized components explains why many of today's products and parts are made of very complex materials sets. However, high complexity products are prone to malfunction, high cost, and significant waste generation.

A switchable surface has the unique property of changing between two states that have different physical properties when activated by a stimulus, for example, heat. The switch is controllable and reversible. The switching between different states is associated with changes in the physical properties of the composition. For example, the ability to switch the surface free energy of a composition is associated with control of properties such as adhesion and release of a substance from the surface of a different composition.

The ability of switching is enabled by incorporation of a switchable material which is ultimately responsible for the switching. Products made with switchable materials require fewer components, and are thus more reliable, have lower cost, and reduce waste.

In view of the above, there is a need for developing improved compositions that incorporate switchable materials. The focus of the present disclosure is on surfaces which can change their wettability (in other words their surface free energy) when activated by heat.

SUMMARY

The present disclosure describes a composition comprising a stimulus-responsive polymer, a base polymer, and a catalyst, wherein the surface free energy of the stimulus-responsive polymer is reversibly adjustable from a first surface free energy state to a second surface free energy state when heated to an activation temperature, and wherein the base polymer does not include a platinum catalyst.

The present disclosure also describes a method of preparing a polymer composition, the method comprising mixing a stimulus-responsive polymer, a base polymer, and a catalyst to create a mixture, wherein the surface free energy of the stimulus-responsive polymer is reversibly adjustable from a first surface free energy state to a second free energy state when heated to an activation temperature, and wherein the catalyst is not a platinum catalyst.

The present disclosure further describes a method of adjusting a surface free energy of a composition comprising a silicone polymer, a catalyst, and a stimulus-responsive polymer, the method comprising heating the composition to an activation temperature, wherein the catalyst is not a platinum catalyst, and the adjustment of the surface free energy of the composition is reversible.

EMBODIMENTS

Figure 1:
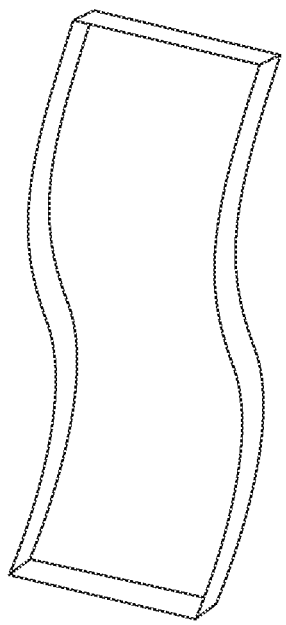
FIG. 1 is a schematic representation of a two-step printing process.
Figure 1:
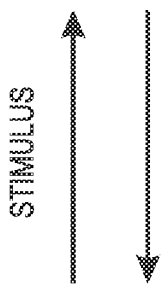
Figure 1:
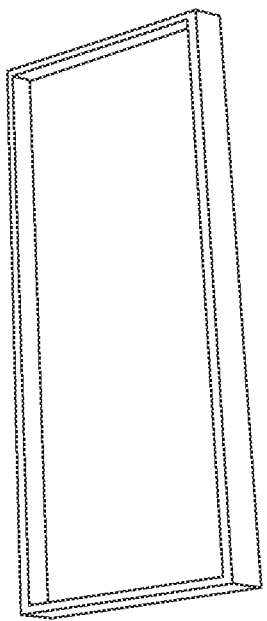

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

The term "alkyl group" refers, for example, to hydrocarbon groups that are linear or branched, saturated or unsaturated, and cyclic or acyclic, and with from about 1 to about 50 carbon atoms, such as from about 5 to about 35 carbon atoms, or from about 6 to about 28 carbon atoms.

The term "oleophobic" refers, for example, to a physical property of a molecule relating to having a lack of a strong affinity for oils. Water and fluorocarbons can be examples of oleophobic compounds. The term "oleophilic" refers, for example, to a physical property of a molecule relating to having an affinity for oils.

The present disclosure describes a composition comprising a stimulus-responsive polymer, a base polymer, and a catalyst, wherein the surface free energy of the stimulus-responsive polymer is reversibly adjustable from a first surface free energy state to a second surface free energy state when heated to an activation temperature, and wherein the base polymer does not include a platinum catalyst.

The stimulus-responsive polymer may be any polymer the changes its conformation in response to a stimulus, for example, heat. The stimulus-responsive polymer may comprise, for example, a unit of Formula (I):

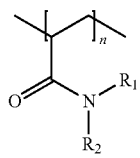

Formula (I)

wherein, "$R_1$" and "$R_2$" are independently hydrogen or alkyl having from 1 to about 10 carbon atoms, such as from about 1 to about 6 carbon atoms, or cycloalkyl with a number of carbons from about 3 to about 10, or may be a heterocycle incorporating the nitrogen atom that is capable of forming hydrogen bonds with a number of carbons from 3 to 5, and "n" is a number from 1 to 1000.

However, not all combinations of R groups may provide a thermally switchable polymer. One of ordinary skill is able to determine which combination of R groups is able to provide a thermally switchable polymer. For example, some combinations with very small alkyl groups are fully soluble in water, such as polymers where the $NR_1R_2$ group is $NH_2$, $NHCH_3$, and $N(CH_3)_2$. Others are totally insoluble in water because the R groups render them too non-polar and do not allow the chain reconfiguration for thermal switching. Such examples include those where the $NR_1R_2$ group is $NH(CH_2CH_2CH_2CH_3)$, $NHC(CH_3)_3$, $N(CH_2CH_3)(CH_2CH_2CH_3)$, and $N(CH_2CH_2CH_3)_2$.

Specific examples of suitable R groups are shown in the Table 1, from Galaev, I. Y. and B. Mattiasson, 15(5) *Enzyme and Microbial Technology* 354 (1993), the disclosure of which is incorporated by reference herein in its entirety.

TABLE 1

Chemical structures, names and switching temperatures of suitable thermally responsive poly(N-substituted acrylamides)

| —$NR_1R_2$ | Activation temperature [LCST] (° C.) |
|---|---|
| NH—$CH_2$—$CH_3$ | 82 |
| NH—$CH_2$—$CH_2$—$CH_3$ | 22 |
| NH—CH—$(CH_3)_2$ | 32-34 |
| N($CH_3$)($CH_2$—$CH_3$) | 56 |
| N($CH_2$—$CH_3$)$_2$ | 32-42 |
| N($CH_2$—$(CH_3)_2$)($CH_3$) | 25 |
| NH—△ | 47 |
| ⬠N— | 55 |
| ⬡N— | 4 |

All other combinations of hydrogen and/or alkyl groups with up to about 6 carbon atoms may not be thermally responsive The stimulus-responsive polymer that may comprise a unit of Formula I may be, for example, a homopolymer or a copolymer. In a homopolymer, the monomeric units of the homopolymer are substantially the same. In a copolymer, the monomeric units of the copolymer may be different. For example, the stimulus-responsive polymer may be a poly-(N-alkylacrylamide) polymer, such as, for example, poly-(N-isopropylacrylamide), poly-(N-ethylacrylamide), poly-(N-n-propylacrylamide), poly(N-ethyl,N-methylacrylamide), poly (N,N-diethylacrylamide), poly(N-isopropyl,N-methylacrylamide), poly(N-cyclopropylacrylamide), poly (N-acryloylpyrrolidine), and poly(N-acryloylpiperidine) and mixtures thereof.

In one example, $R_1$ may be isopropyl and $R_2$ may be H, so that the stimulus-responsive polymer is poly(N-isopropylacrylamide) (PNIPA) (for example, a homopolymer) or an N-isopropylacrylamide copolymer (NIPAM). PNIPA, has the following formula:

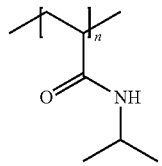

wherein n may be an integer of from about 3 to about 1000, such as from about 5 to about 500, or from about 10 to about 300. PNIPA is a heat sensitive material that exhibits a large change in surface energy in response to a small change in temperature. See, for example, N. Mori et al., *Temperature Induced Changes in the Surface Wettability of SBR+PNIPA Films*, 292, Macromol. Mater. Eng. 917, 917-22 (2007), the entire disclosure of which is incorporated herein in its entirety. PNIPA has a hydrophobic isopropyl group on a side chain. It is soluble in water below 32° C. and becomes insoluble when heated above this critical temperature. This switching temperature (32° C.) between hydrophilic and hydrophobic states is called the lowest critical solution temperature (LCST). The contact angle of a water drop placed onto a PNIPA polymer film may change dramatically above and below the LCST. For example, the contact angle of a water drop placed onto the PNIPA film changed from about 60° (hydrophilic) below 32° C. to over about 93° (hydrophobic) when heated above 32° C.

When the polymer is an N-isopropylacrylamide (NIPAM) copolymer, the acrylamide monomer may comprise from about 30 to about 100% of the repeating units of the copolymer, or from about 30% to about 100 mole % of the copolymer. The other comonomer of the copolymer may be, for example, styrene, bisphenol-A, acrylic acid, 4-vinylphenylboronic acid (VPBA), ethylmethacrylate; methylmethacrylate (MMA), butylmethacrylate (BMA), N,N-diethylaminoethyl methacrylate (DEAEMA), or methacrylic acid (MAA). The other comonomer could also be a fluorinated alkyl acrylate or fluorinated alkyl methacrylate, such as hexafluoroisopropylmethacrylate (HFIPMA) or 2,2,3,3,4,4-hexafluorobutylmethacrylate (HFBMA). The other comonomer could also be another acrylamide monomer, such as N-ethylacrylamide (NEAM), N-methylacrylamide (NMAM), N-n-propylacrylamide (NNPAM), N-t-butylacrylamide (NtBA), or N,N-dimethylacrylamide (DMAM).

The stimulus-responsive polymer may comprise, for example, poly(N-vinyl-caprolactam), represented by a unit of Formula II, which switches at a temperature of about 31° C.:

Formula II

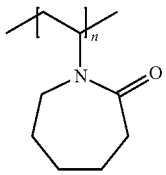

The stimulus-responsive polymer may comprise, for example a poly(2-alkyl-2-oxazoline), represented by the Formula III:

Formula III

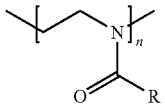

wherein R is an alkyl group selected from propyl, isopropyl or ethyl, and n is as defined above.

The switching temperatures are about 62° C. for when R is ethyl, about 36° C. for when R is isopropyl, and about 25° C. for when R is n-propyl.

The stimulus-responsive polymer may comprise alkyl-substituted celluloses, for example, methylcellulose, with a switching temperature of about 50° C., as represented by Formula IV, wherein n is as defined above.

Formula IV

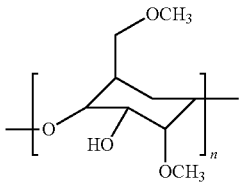

The stimulus-responsive polymer is mixed with a base polymer. A base polymer may be any polymer that does not completely prevent the stimulus-responsive polymer from changing its conformation in response to a stimulus. As a general guiding rule, the miscibility between the stimulus responsive polymer and the base polymer is limited. Limited miscibility refers, for example, to a dry film made of a coating composition that will form separate domains of thermally switchable polymer dispersed into base polymer material.

The base polymer may be, for example, silicone materials, such as fluorosilicones, and silicone rubbers, such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC™ 735 black RTV and SILASTIC™ 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones (including partially fluorinated fluorosilicones and fully fluorinated fluorosilicones) such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC™ 590 LSR, SILASTIC™ 591 LSR, SILASTIC™ 595 LSR, SILASTIC™ 596 LSR, and SILASTIC™ 598 LSR from Dow Corning.

A precursor to form the base material may be, for example, a silanol terminated polymer with weight average molecular weights ranging from 1,000 to 150,000. Before mixing with the stimulus-responsive polymer, the base material may be partially cross-linked, and then mixed with the stimulus-responsive polymer before the base material is fully cured. The base polymer may be stored in the partially cross-linked form until needed for mixing with the stimulus-responsive polymer. For example, in a silanol terminated polymer, the polymer may be reacted with an excess of moisture-sensitive multi-functional silanes that contain, for example, acetoxy compounds, as shown below.

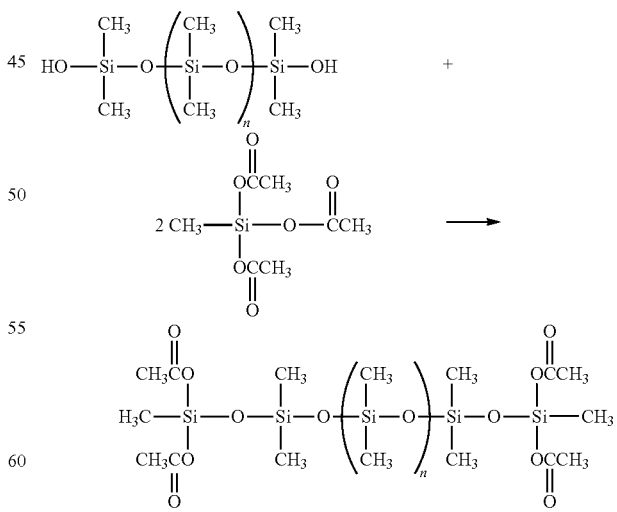

As shown above, the silicone has two acetoxy groups at each end. This allows for cross-linking of the polymer by hydrolysis, for example, by exposing the partially cross-linked polymer to moisture. When exposed to moisture, a second stage reaction occurs at the end acetoxy groups, thus forming the cured base polymer. In the example, above, the cured base polymer would have the formula shown below.

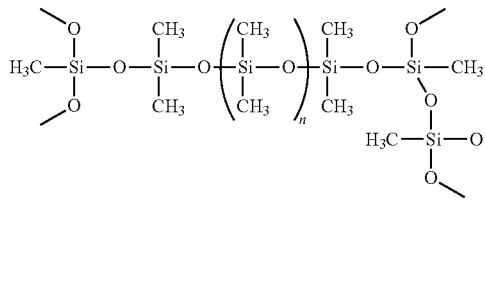
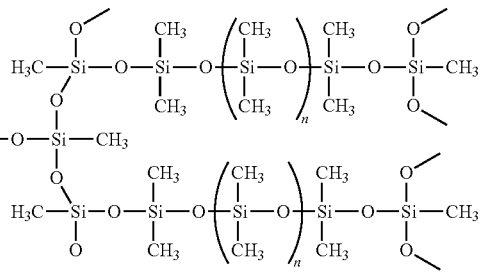

In order to speed the cross-linking discussed above, a catalyst may be added to the polymer. In other words, before mixing the base polymer with the stimulus-response polymer, a catalyst may be mixed with the base polymer, such that the base polymer contains the catalyst when mixed with the stimulus-response polymer. Alternatively, the base polymer, stimulus-response polymer, and the catalyst may be mixed together as individual components. A catalyst refers, for example to, a substance that increases the rate of a chemical reaction. The catalyst can be a transition metal organometallic compound or a base. An organometallic compound refers, for example to, a metal atom bonded to an organic group or groups.

The organometallic catalyst may be, for example, a tin (Sn) compound, for example, stannous octoate, dibutyl tin dilaurate, dioctyl tin dilaurate, dibutyl tin mercaptide, dioctyltin carboxylate, tetrabutyl tin stannoxane, dibutyltin ketonate, dioctyltin carboxylate, dimethyltin carboxylate, dibutyl tin diricinoleate, $Ca(OCH(CH_3)_2)_2$, $NaOCH_3$, $NaOC_2H_5$, and the like, and mixtures thereof. The organometallic catalyst may be a titanium (Ti) alkoxylate compound. For example the catalyst may be titanium (IV) di-alkoxy-di-acetylacetonate of a general structure $Ti(OR)_2(acetylacetonate)_2$, where R is an alkyl group, for example, methyl, ethyl propyl, isopropyl, and butyl.

It has been found that acid compounds are not suitable for catalyzing the cross-linking of the base materials when PNIPA polymer is present. It is believed that the acid catalyst is deactivated by forming hydrogen bonds with the nitrogen atoms for the PNIPA polymer.

However, the catalyst may not include a platinum catalyst. It has been found that, when stimulus-responsive polymer is mixed with a base polymer and a catalyst, if a platinum catalyst is included in the mixture, the platinum catalyst interferes with the mixture's ability to cure. Without being bound by this theory, it is theorized that a platinum catalyst is deactivated due to chemical co-ordination of the by nitrogen atoms present in, for example, the PNIPA polymer.

Before mixing the stimulus-responsive polymer, the base polymer, and the catalyst together, the stimulus-responsive polymer and the base polymer may each be separately dispersed in a solvent. The solvent may be the same solvent, or a different solvent. However, the solvent used to disperse the stimulus-responsive polymer should be compatible with the base polymer, and the solvent used to disperse the base polymer. Similarly, the solvent used to disperse the base polymer should be compatible with the stimulus-responsive polymer, and the solvent used to disperse the stimulus-responsive polymer. Compatible refers, for example, to a solvent that is miscible with another solvent, and does not cause a substantial amount of the stimulus-responsive polymer or the base polymer to precipitate out of the mixture. "Substantial amount" refers, for example, to an amount greater than about 50% of the stimulus-responsive polymer or the base polymer precipitating out of the solution.

Suitable solvents include, for example, water and/or organic solvents including, tetrahydrofuran (THF), acetone, acetonitrile, carbon tetrachloride, chlorobenzene, diethyl ether, dimethyl ether, dimethyl formamide, dimethyl sulfoxide, methylene chloride, pentane, methyl ethyl ketone, cyclohexanone combinations thereof, and the like.

The stimulus-responsive polymer may be mixed with the base polymer and the catalyst to form the polymer composition in an effective amount to impart to the polymer composition the desired property and degree of surface free energy adjustment. For example, the stimulus-responsive polymer is mixed with the base polymer in proportions of from about 5 to about 80% compared to the base polymer, such as from about 10% to about 70%, or from about 15% to about 50%. In addition, the catalyst may be included in the mixture in an amount that increases the rate of cross-linking of the base polymer. For example, the catalyst may be added in an amount ranging from 0.1 mol % to about 20.0 mol %, from about 0.2 mol % to about 15.0 mol %, or from about 1.0 mol % to about 5.0 mol %.

Other optional components may be included in the mixture as desired to impart other desirable properties to the composition. For example, a binder material may be added to improve adhesion of the mixture to a particular surface, a filler material may be added to increase the viscosity or thickness of the composition, and/or colorant may be added to impart a particular color to the mixture. However, the other optional component(s) should not prevent the mixture from substantially curing, or prevent the stimulus responsive polymer from responding to a particular stimulus. "Substantially curing" refers, for example, to at least 80% of the mixture curing.

After mixing the stimulus-responsive polymer, the base polymer, the catalyst, and other optional component(s), the mixture may be deposited onto a suitable substrate or cast into any desired shape.

The substrate may include, for example, metals, rubbers, and fabrics. Metals include, for example, steel, aluminum, nickel, their alloys, and like metals and the alloys of the like metals. Examples of suitable rubbers include, for example, ethylene propylene dienes, fluoroelastomers, n-butyl rubbers, silicone rubbers and other elastomers and the like. A "fabric material" refers, for example, to a textile structure comprised of mechanically interlocked fibers or filaments, which may be woven or nonwoven. Fabrics are materials made from fibers or threads and woven, knitted, or pressed into a cloth or felt type structures. "Woven" refers, for example, to fabrics closely oriented by warp and filler strands at right angles to each other. "Nonwoven" refers, for example, to randomly integrated fibers or filaments. Examples of fabrics include woven or nonwoven cotton fabric, graphite fabric, fiberglass, woven or nonwoven polyimide, woven or nonwoven polyamide (for example, KEVLAR™, available from DuPont or nylon) or polyphenylene isophthalamide (for example, NOMEX™, of E. I. DuPont of Wilmington, Del.), polyester, aramids, polycarbonate, polyacryl, polystyrene, polyethylene, polypropylene, cellulose, polysufone, polyxylene, polyacetal, and the like, and mixtures thereof. The substrate may have any desired thickness.

The polymer composition may be deposited on the substrate by any suitable process. Methods for depositing the mixture on the substrate include draw-down coating, spray coating, spin coating, flow coating, dipping, spraying such as by multiple spray applications of very fine thin films, casting, web-coating, roll-coating, extrusion molding, laminating, or the like. The thickness of the surface coating may be any of any suitable thickness that allows for the mixture to cure. For example, the thickness of the surface coating may range from about 1 micron to about 3 cm, from about 5 microns to about 1 cm, or from about 10 microns to about 0.5 cm. For example, the thickness of the surface coating may be from about 5 to about 500 microns thick, such as from about 10 to about 400 microns, or from about 20 to about 300 microns. After coating the mixture onto a substrate, the mixture may be cured.

Casting involves pouring the mixture into a mold, and then curing. The mold may be of any desired shape or size. After the mold has been filled with the desired amount of the mixture, the mixture may be cured. The polymer mixture may be coated or poured into a mold for casting at any appropriate temperature. For example, the polymer mixture may be coated or poured into a mold for casting at a temperature of from about 35° C. to about 55° C., or from about 40° C. to about 50° C., such as about 40° C., in order to maintain compatibility in the hydrophobic state.

The mixture may be cured over a time period at any desired temperature that is below the melting point of the cured mixture. The time period needed to cure depends on many factors, for example, the thickness of the coating or mold, the relative humidity in the air, and the temperature at which the mixture is cured, and one of ordinary skill understands how to determine the time needed to cure the mixture based on these factors.

For example, the mixture may be cured for about 0.5 hours to about 48 hours, such as from about 1 hour to about 36 hours, or from about 2 hours to about 24 hours. The polymer mixture may be cured at an appropriate temperature that is below the melting point of the cured mixture, such as from about 10° C. to about 200° C., or from about 20° C. to about 150° C., or from about 30° C. to about 130° C. For example, the mixture may be cured at room temperature. "Room temperature" refers, for example, to a temperature of about 20° C. to about 25° C.

After the composition has substantially cured, the surface free energy of the composition may be switched in response to a stimulus, such as being heated to an activation temperature. Thus, the surface free energy of the composition may be adjusted. For example, the adjustment of the surface free energy may enable both wetting of a surface of the composition, or a transfer of a substance on the surface of the composition to a different surface.

More particularly, it is believed that the stimulus-responsive polymer itself exhibits the property that reversibly adjusts from a first surface free energy state to a second surface free energy state when exposed to an activation temperature. In turn, because the stimulus-responsive polymer is mixed with the base polymer to form the polymer composition, the stimulus-responsive polymer, when incorporated into the polymer composition in an effective amount, imparts to the polymer composition as a whole the property of reversibly adjusting from a first surface free energy state to a second surface free energy state when exposed to an activation temperature.

In addition, as a general matter, the wettability or spread of a liquid on a surface is governed by the forces of interaction between the liquid, the surface, and the surrounding air, and in particular the surface free energy, as relating to the surface chemistry and surface topology. Surface tension is a parameter that can be described as the interaction between the forces of cohesion and the forces of adhesion, which determines whether or not wetting, or the spreading of liquid across a surface, occurs.

Young's Equation, which defines the balance of forces caused by a wet drop on a dry surface, stipulates that:

$$\gamma_{SL} + \gamma_{LV} \cos\theta = \gamma_{SV}$$

wherein $\gamma_{SL}$=forces of interaction between a solid and liquid; $\gamma_{LV}$=forces of interaction between a liquid and surrounding air; $\gamma_{SV}$=forces of interaction between a solid and surrounding air; and $\theta$=contact angle of the drop of liquid in relation to the surface. Young's Equation also shows that, if the surface tension of the liquid is lower than the surface energy, the contact angle is zero and the liquid wets the surface. The surface energy depends on several factors, such as the chemical composition and crystallographic structure of the solid, and in particular of its surface, the geometric characteristics of the surface and its roughness, and the presence of molecules physically adsorbed or chemically bonded to the solid surface.

As discussed above, the surface free energy of the cured composition may be switched from a first surface free energy state to a second surface free energy state in response to a change in temperature. For example, the surface free energy of the cured composition may be reversibly switched from a relatively higher surface free energy state to a relatively lower surface free energy state when heated to an activation temperature. However, the direction in which the stimulus-responsive polymer switches when heat is applied may vary. For example, the surface free energy of cured composition may increase when the cured composition is heated above the activation temperature. Alternatively, the surface free energy of the stimulus-responsive polymer may decrease when the cured composition is heated above the activation temperature. Accordingly, for example, the cured composition described above may be hydrophilic at temperatures below the activation temperature, and hydrophobic at elevated temperatures. Alternatively, for example, the cured composition may be oleophilic at temperatures below the activation temperature and oleophobic at elevated temperatures.

In addition, for example, the cured polymer composition may reversibly switch from a relatively higher first surface free energy state to a relatively lower second surface free energy state when heated to a temperature at or greater than an activation temperature. A higher surface free energy state may result in smaller contact angles, for example, with a droplet of water, and indicates that the surface is more hydrophilic. A lower surface free energy state may result in higher contact angles, for example, with a droplet of water, and indicates that the surface is more hydrophobic. When the temperature of the cured polymer composition is less than the activation temperature, the polymer composition may switch to the relatively higher surface free energy state. Thus, for example, the surface free energy of the polymer composition may be switched reversibly and controllably when heated between two states: a higher surface free energy state and a lower surface free energy state. The lower surface free energy state may, for example, enable transfer of a substance on a surface of the cured composition, while the higher surface free energy state may enable spreading (wetting). A surface free energy state that enables the spreading (wetting) step may have a surface free energy that is greater than the surface tension of the liquid ink, while a surface free energy state that enables transfer may have a surface free energy that is lower than the surface free energy of the dry (resin) ink.

The surface free energy of the stimulus-responsive polymer in the first surface free energy state may be from about 25 to about 65 dynes/cm, such as from about 30 to about 60 dynes/cm, or from about 30 to about 55 dynes/cm. The second surface free energy state may be, for example, from about 8 to about 30 dynes/cm, such as from about 10 to about 25 dynes/cm, or from about 15 to about 25 dynes/cm. Surface free energy is calculated by measuring three liquids' contact angle. The three liquids are water, formamide, and diiodomethane. The surface free energy, acid and base components of the polar surface energy, as well as the dispersive component were calculated using Lewis acid-base method. Lewis acid-base theory is given by the following equation for the solid-liquid interfacial energy:

$$\gamma_j(1 + \cos\theta_j) = 2(\gamma_s^{LW}\gamma_j^{LW})^{\frac{1}{2}} + 2(\gamma_s^- \gamma_j^+)^{\frac{1}{2}} + 2(\gamma_s^+ \gamma_j^-)^{\frac{1}{2}}$$

where (LW), (+), (−) are the dispersive, acid and base components of the SFE index, j refers to liquids 1, 2, 3, $\theta_j$ is the contact angle of the jth liquid on the substrate, $\gamma_j$ is the surface tension of liquid j, and subscript s refers to the solid.

Additionally, characterization of the wetting properties of the cured polymer composition may be carried out by measuring the water droplet contact angle at a given temperature. The water contact angle may be measured, for example, by a Fibro DAT1100 instrument manufactured by System AB, a FTA1000 instrument manufactured by First Ten Angstroms, or a Dataphysics DCAT 21 dynamic contact angle measuring instrument. The contact angle represents an average of the wetting performance of the base materials and the stimulus-responsive polymer. For example, below the activation temperature, the cured polymer composition may have a water contact angle of from about 80° to about 150°, such as from about 90° to about 140°, or from about 100° to about 130°. In embodiments, at or above the activation temperature, cured polymer composition may have a water contact angle of from about 10° to about 70°, such as from about 15° to about 50°, or from about 20° to about 45°.

The degree of wettability change (that is, the difference in wettability between the polymer composition in the first surface free energy state and the second surface free energy state) may be adjusted through selection and concentration of the components of the mixture. For example, the blended polymer may include from about 50% to about 95% of a polymer base material having a relatively low surface free energy (that is, in embodiments, having a fixed surface free energy of from about 10 to about 25 dynes/cm, such as from about 10 to about 23 dynes/cm, or from about 15 to about 20 dynes/cm), and, thus, the wetting of the surface may be switched between a less hydrophobic and a more hydrophobic state. The degree of wettability change may also be controlled by selection of a particular base polymer (for example, a base polymer having a desired surface free energy), as well as by adjustment of the concentration of the stimulus-responsive polymer in the blend. The difference between the contact angle in the first surface free energy state and the contact angle of the polymer composition in the second surface free energy state may be from about 5° to about 140°, such as from about 10° to about 100°, or from about 10° to about 60°. For example, the cured composition may change water contact angles of the liquid on the surface of the cured composition from about 95° to about 118° when heated from room temperature to about 70° C.

Any suitable temperature source may be used to cause the temperature change in the cured composition to be at least the activation temperature. The heat sources include, for example, a heat lamp, an optical heating device, for example, a laser or an LED bar, including IR light LED bar, a thermal print head, resistive heating fingers, or a microheater array. A resistive heating finger is an array of finger-like micro-electrodes that result in resistive heating when the fingers are in contact with the surface that is to be heated. The cured composition may cool on its own from contact with a colder substrate and after the removal of heat. Optionally, an air jet could be used to accelerate cooling.

The stimulus-responsive polymer may be considered as activate (for example, switch between a relatively higher surface free energy and a relatively lower surface free energy) when heated to an activation temperature of from about 10° C. to about 120° C., from about 15° C. to about 100° C., or from about 20° C. to about 80° C. In other words, the stimulus-responsive polymer may switch states when heated to a temperature greater than about 10° C. and less than about 120° C., such as from about 25° C. to about 90° C., or from about 30° C. to about 70° C.

In addition, the switch between, for example, a relatively higher surface free energy and a relatively lower surface free energy may be reversible, for example, by cooling the composition to any temperature below the activation temperature.

However, it is also understood that the activation temperature of the stimulus-responsive polymer may be generally affected by the solvent, optional component(s) (such as a binder), or polymer matrix in general. The values reported in Table 1 above are for solutions in water. However, it is known that the presence of organic binder increases the activation temperature for a given thermally switchable material. For example, poly-(N-isopropylacrylamide) changes its surface free energy, for example, switches its surface free energy from a first higher state to a second lower surface free energy state, at 32° C. in water, but at 41° C. in mixture with an organic polymer such as SBR rubber. When dissolved in an organic solvent such as THF, the activation temperature shifted to 60° C. See N. Mori et al., *Temperature Induced Changes in the Surface Wettability of SBR+PNIPA Films*, 292 Macromol. Mater. Eng. 917, 917-22 (2007).

Figure 2:
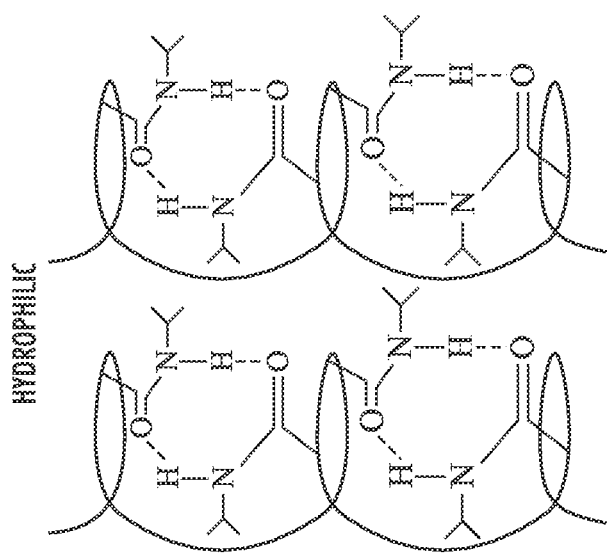
FIG. 2 is a diagram illustrating the difference in hydrogen bonding of a poly(n-isopropylacrylamide) polymer above and below a lower critical solution temperature (LCST).
Figure 2:
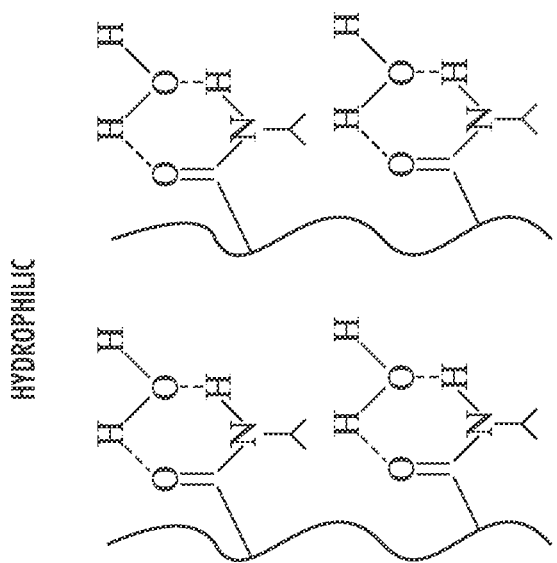

Without being bound by any particular theory, it is believed that the thermally switchable property of the stimulus-responsive polymer is due to the intermolecular hydrogen bonding interactions of the stimulus-responsive polymer. For example, at a temperature below LCST, the PNIPA chains form expanded structures caused by intermolecular hydrogen bonding occurring predominantly between the PNIPA chains and the water molecules present in the applied solution. This intermolecular bonding contributes to the hydrophilicity of the PNIPA-modified surface. However, at temperatures above the LCST, hydrogen bonding occurs predominantly between the PNIPA chains themselves, with the carbonyl oxygen atom of one PNIPA chain bonding to the hydrogen atom on the nitrogen atom tom of the adjacent PNIPA chain. This intermolecular hydrogen bonding between the C=O and N—H groups of adjacent PNIPA chains results in a compact conformation wherein the C=O and N—H groups are not available to interact with water molecules, which results in hydrophobicity at temperatures above the LCST. These two states (for example, when the temperature is less than the LCST and when the temperature is greater than the LCST) are illustrated in FIG. 2. This interaction is not dependent on the isopropyl chain, and thus should apply to other polymers as well.

The polymer composition may be used in any suitable apparatus where the ability to switch the surface free energy of a composition is desired. For example, polymer composition may be used as an intermediate transfer member that is suitable for use in indirect printing.

EXAMPLES

Coating Materials Composition

A stock solution of a one part RTV silicone precursor was prepared by dispersing 2 grams (g) of a commercially available clear silicone containing a premixed tin catalyst in 5 g of methyl ethyl ketone (MEK) as a solvent. The solution was shaken with high speed shaker for 10-15 minutes. The stock solution was used in the next 30 minutes to prevent uncontrollable curing. Separately a stock solution of 20% PNIPA (weight average molecular weight ($M_W$)=40,000 from Polysciences, Inc.) in MEK solvent was prepared.

3 g of the stock silicone solution in MEK and 1.05 g of the PNIPA solution in MEK were mixed for 5 minutes with a high speed shaker (2500 rpm) followed by additional shaking at a lower speed (700 rpm) for 10 minutes.

Coating and Curing

A plastic polyethylene terephthalate (PET) substrate (Mylar®) was cleaned with tetrahydrofuran (THF) and dried. Then the PNIPA/silicone solution was coated with a blade having a gap of 10 mils, at low speed. The coating was allowed to cure at room temperature for 24 hours prior to testing (Example 1).

A coating of the silicone stock solution was also coated and cured as described above for comparison (Comparative Example 1).

For Comparative Example 2, stock solutions of a two part silicone precursor system (Silgard 184) which incorporates a platinum catalyst and PINIPA were prepared in methyl ethyl ketone (MEK) a solvent, coated. The films did not cure even when heated at temperatures up to 155° C. for several hours. Comparative samples which did not contain PNIPA cured under the same curing conditions.

Testing of the Cured Coating

A droplet of water was placed onto each cured film. The contact angle of the water was measured by using an FTA200 Contact Angle Instrument.

A FTA200 is a flexible video system for measuring contact angle, surface and interfacial tensions, wettability, and absorption. The contact angle of the water droplet was measured on substrate at different temperatures by mounting a heating mantle under the substrate while keeping the liquid at constant elevated temperature, or at room temperature. Measurements were performed at room temperature (23° C.) and at 70° C. Samples were allowed to equilibrate to the selected temperature for 5 minutes prior to each measurement. For each sample and temperature, two measurements were taken and the average value is reported in Table 2.

TABLE 2

| | | Contact Angle at Temperature | | | |
| | | @ 23° C. | | @ 70° C. | |
| Sample | % PNIPA (dry film) | Average Contact Angle | Standard Dev | Average Contact Angle | Standard Dev. |
| Comparative Example 1 | 0.00% | 106.11 | 2.64 | 104.13 | 0.82 |
| Example 1 | 19.60% | 95.62 | 0.25 | 118.15 | 1.82 |

As shown in Table 2, in Example 1, a significant change of the contact angle at room temperature occurred when compared with the value measured for the heated sample. At room temperature, the contact angle (CA) was about 95°, meaning that the sample has a more hydrophilic character. At 70° C. the CA was about 118°, meaning that the sample has a high hydrophobic character.

For comparison, Comparative Example 1, which contains only the cured silicone and no switchable material (PNIPA), had a CA of about 106° at room temperature, and showed no significant change in the CA when heated to 70° C., (a CA of about 104°).

Reversibility Testing

Next, the reversibility of the switchable material was tested.

Multiple switching was tested by measuring the contact angle of a sample for multiple heat/cool cycles. The contact angle was measured at each temperature (23° C. and 70° C.) after allowing the sample to equilibrate for 5 minutes at the selected temperature, as described above. The cycling results are shown in FIG. 3.

Figure 3:
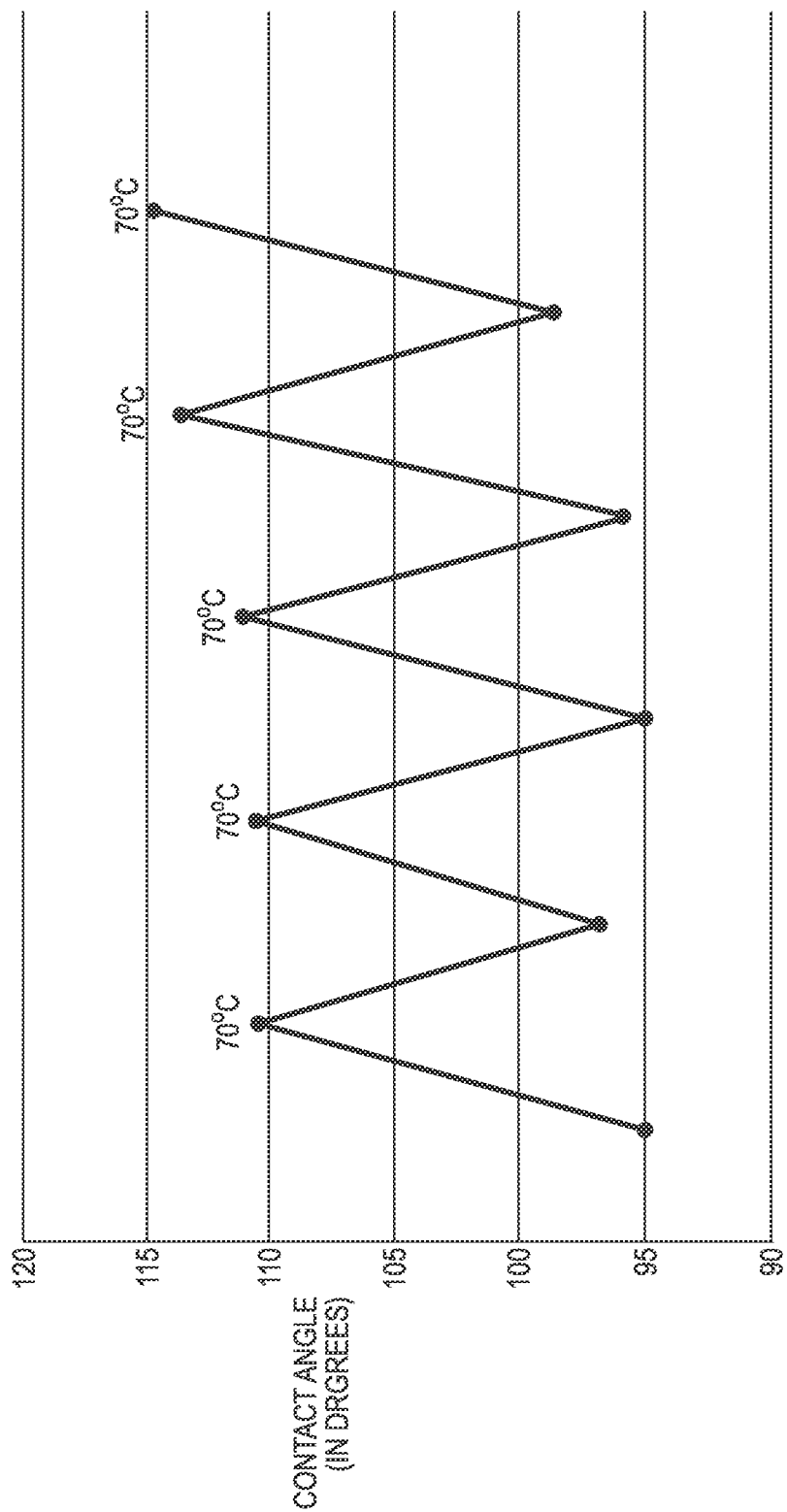
FIG. 3 is a graph showing the contact angle of a droplet of water on that can be consistently switched successively between a higher and a lower contact angle value.

As can be seen in FIG. 3, while there is some variation in the CA at each temperature. However, the sample could be consistently switched successively between a higher and a lower contact angle value.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A composition comprising a stimulus-responsive polymer, a silicone base polymer and a catalyst, wherein the surface free energy of the stimulus-responsive polymer is reversibly adjustable from a first surface free energy state to a second surface free energy state when heated to an activation temperature, and wherein the base composition does not include a platinum catalyst.

2. The polymer composition according to claim 1, wherein the surface free energy of the first surface free energy state is from about 25 to about 65 dynes/cm, and the surface free energy of the second surface free energy state is from about 8 to about 30 dynes/cm.

3. The polymer composition according to claim 1, wherein the catalyst is an organometallic catalyst comprising tin or titanium.

4. The polymer composition according to claim 1, wherein the stimulus-responsive polymer comprises a monomer unit selected from the group consisting of N-isopropylacrylamide, N-ethylacrylamide, N-n-propylacrylamide, N-ethyl,N-methylacrylamide, N,N-diethylacrylamide, N-isopropyl,N- methylacrylamide, N-cyclopropylacrylamide, N-acryloylpyrrolidine, N-acryloylpiperidine, N-vinyl-caprolactam, 2-alkyl-2-oxazoline, an alkyl-substituted cellulose, and mixtures thereof.

5. The polymer composition according to claim 1, wherein the stimulus-responsive polymer is selected from the group consisting of poly-(N-isopropylacrylamide), poly-(N-ethylacrylamide), poly-(N-n-propylacrylamide), poly(N-ethyl,N-methylacrylamide), poly(N,N-diethylacrylamide), poly(N-isopropyl,N-methylacrylamide), poly(N-cyclopropylacrylamide), poly(N-acryloylpyrrolidine), poly(N-acryloylpiperidine), poly(N-vinyl-caprolactam, poly(2-alkyl-2-oxazoline), alkyl-substituted celluloses, and mixtures thereof.

6. The polymer composition according to claim 1, wherein the activation temperature is from about 10° C. to about 120° C.

7. The polymer composition according to claim 1, wherein the stimulus-responsive polymer is selected from the group consisting of a polymer of Formula I:

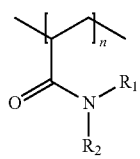

Formula I wherein,
$R_1$ and $R_2$ are independently
a hydrogen or alkyl having from 1 to about 10 carbon atoms,
cycloalkyl with a number of carbons from about 3 to about 10, or
a heterocycle incorporating the nitrogen atom in Formula I that is capable of forming hydrogen bonds, the heterocycle having with a number of carbons from 3 to 5, and
n is a number from 1 to 1000;
a polymer of Formula II:

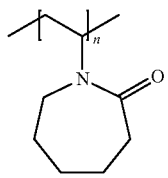

Formula II wherein n is as defined above;
a polymer of Formula III:

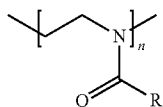

Formula III wherein R is an alkyl group selected from the group consisting of propyl, isopropyl, and ethyl, and n is as defined above;

a polymer of Formula IV:

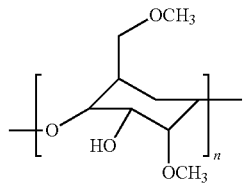

Formula IV wherein n is as defined above; and
mixtures thereof.

8. The polymer composition according to claim 1, wherein the stimulus-responsive polymer is present in an amount of from about 5% to about 80% compared to the base polymer.

9. The polymer composition according to claim 1, wherein the polymer composition comprises poly-(N-isopropylacrylamide) as the stimulus-responsive polymer, the base polymer is formed from a room temperature vulcanizing silicone polymer, and the catalyst is a tin catalyst.

10. A device comprising the polymer composition according to claim 1.

11. A method of preparing a polymer composition, the method comprising:
mixing a stimulus-responsive polymer, a silicone base polymer, and a catalyst to create a mixture;
wherein the surface free energy of the stimulus-responsive polymer is reversibly adjustable from a first surface free energy state to a second free energy state when heated to or above an activation temperature, and wherein the catalyst is not a platinum catalyst.

12. The method according to claim 11, wherein the method further comprises curing the mixture.

13. The method according to claim 11, wherein the stimulus-responsive polymer is present in an amount of from about 5% to about 80% compared to the base polymer.

14. The method according to claim 11, wherein before the mixing, the base polymer contains the catalyst, and the base polymer containing the catalyst, and the stimulus-responsive polymer, are each separately dispersed in a solvent.

15. The method according to claim 14, wherein the solvent used to separately disperse the base polymer containing the catalyst and the stimulus-responsive polymer is the same solvent.

16. The method according to claim 11, wherein the stimulus-responsive polymer is selected from the group consisting of poly-(N-isopropylacrylamide), poly-(N-ethylacrylamide), poly-(N-n-propylacrylamide), poly(N-ethyl,N-methylacrylamide), poly(N,N-diethylacrylamide), poly(N-isopropyl,N-methylacrylamide), poly(N-cyclopropylacrylamide), poly(N-acryloylpyrrolidine), poly(N-acryloylpiperidine), poly(N-vinyl-caprolactam, poly(2-alkyl-2-oxazoline), alkyl-substituted celluloses, and mixtures thereof.

17. The method according to claim 11, wherein the base polymer is formed from a room temperature vulcanizing silicone polymer.

18. The method according to claim 11, wherein the catalyst is a tin catalyst.

19. A method of adjusting a surface free energy of a composition comprising a silicone polymer, a catalyst, and a stimulus-responsive polymer, the method comprising:
heating the composition to an activation temperature, wherein
the catalyst is not a platinum catalyst, and
the adjustment of the surface free energy of the composition is reversible by cooling the composition.

* * * * *